Aug. 29, 1939.  E. D. WALTER  2,170,981
VEHICLE BUMPER
Filed June 7, 1938
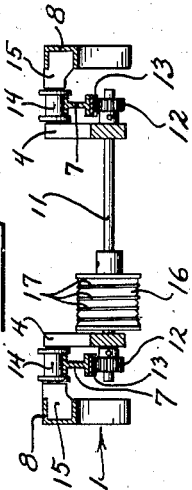
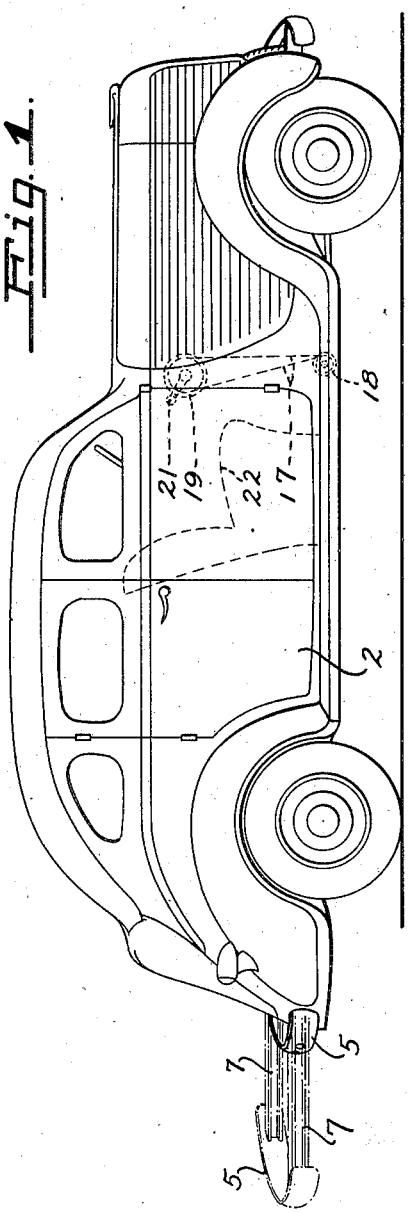
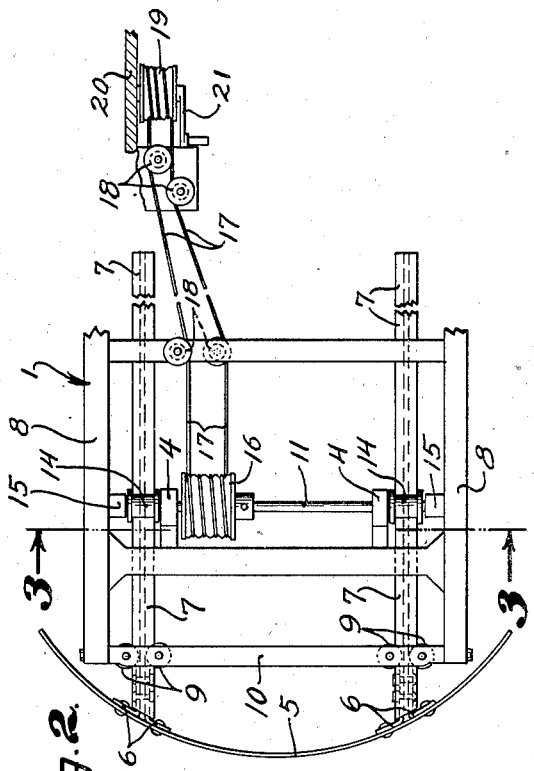
INVENTOR.
Elias D. Walter Patented Aug. 29, 1939

2,170,981

UNITED STATES PATENT OFFICE 2,170,981

VEHICLE BUMPER

Elise D. Walter, Canoga Park, Calif.

Application June 7, 1938, Serial No. 212,271

2 Claims. (Cl. 293—55)

My invention relates to improvements in vehicle bumpers and more particularly to automobile parking bumpers.

The primary object of my invention is to provide an automobile bumper adapted to be extended rearwardly from an automobile to serve as a support for luggage or the like.

Another object of my invention is to provide an extensible automobile bumper adapted for the purpose of temporarily elongating the vehicle, when parked, to prevent the too close parking of another vehicle.

Still another object of my invention is to provide a means for readily controlling the parking space occupied by a vehicle to insure the convenient removal of the vehicle when other vehicles are parked close thereto.

Broadly, my invention comprises an automobile bumper mounted in the frame of an automobile in such a manner as to allow it to be readily extended to a substantial distance from the rear of the automobile, and a controlling device for actuating the said bumper to and from the rear of the said automobile, the controlling device being preferably located adjacent the front seat.

Although my invention is illustrated and described as adapted for use with an automobile, it is understood that it can be equally well adapted to other types of vehicles; and although it is shown as applied to the rear only of an automobile, it is understood that my invention can be applied to either the front or rear, or to both the front and rear of a vehicle.

With the above mentioned objects in view, the invention comprises the novel construction and combination of parts hereinafter described and shown on the accompanying drawing, it being understood that various changes in the form, proportions, and minor details of construction within the scope of the appended claims, may be made without departing from the spirit of the invention.

In the accompanying drawing:

Fig. 1 is a side elevational view of an automobile with the rear bumper shown in the extended position in broken lines, and the control device indicated adjacent the front seat of the automobile, Fig. 2 is a top plan view of the rear end of the frame of an automobile showing the means of mounting and controlling the bumper, and Fig. 3 is a sectional view taken on the line 3—3 of Fig. 2.

Referring to the drawing, wherein like characters of reference designate corresponding parts, the frame 1 of an automobile 2 is formed with a cross member 3 on which suitable bearing blocks 4 are mounted.

A bumper 5 is attached by brackets 6 to the ends of two horizontal I-shaped members 7 which extend between and substantially parallel to the side members 8 of the frame 1.

Each member 7 is positioned between a pair of guide rollers 9 mounted on a cross-member 10 of the frame 1.

Extending transversely beneath the member 7 is a shaft 11 journaled in the bearing blocks 4 and mounting geared pinions 12 which are positioned directly beneath each of the members 7 and are adapted to mesh with the straight gears, or racks 13 secured to the lower surfaces of the members 7.

Flanged guide rollers 14 are positioned directly above the pinions 12 and are adapted to engage with the upper surfaces of the members 7, each roller 14 being mounted on a short shaft which is journaled in a bearing block 4 and in a bearing 15 mounted on the side member 8 of the frame 1.

A circumferentially grooved drum 16 is pinned to the shaft 11, and an endless cable 17 is wound several turns around the drum 16, passed over guide pulleys 18 to another similarly grooved drum 19 and is wound several turns thereon. The drum 19 is mounted on the side wall 20 of the body of the automobile 2 and adjacent the driver's seat 22. A hand crank 21 axially secured to the drum 19 is adapted to turn the same.

The turning of the hand crank 21 and the drum 19 causes a corresponding turning of the drum 16 by virtue of the endless cable 17 thereon. This causes the shaft 11 and the pinions 12 to also rotate. The pinions 12 meshing with the racks 13 cause the members 7 to move longitudinally in a path directed by the guide rollers 14 and 9, thereby carrying the bumper 5, attached thereon, rearwardly away from the cross-member 10 of the frame 1.

The rearwardly extended members 7 together with the bumper 5 forms a supporting frame for luggage or the like as clearly shown with broken lines in Fig. 1.

When the automobile 1 is parked, the bumper 5 can be extended as in Fig. 1, to prevent the parking of another vehicle against the rear of the automobile 1. Locking the automobile 1 prevents access to the control crank 21 by another person.

To remove the automobile 1 from its parking space, the bumper 5 is retracted to its normal position adjacent the rear of the automobile 1 as shown with solid lines in Fig. 1, by turning the crank 21 in a reverse direction.

If other vehicles have been parked in contact with the front and rear bumpers of the automobile 1, the retraction of the bumper 5 will allow sufficient space in which to maneuver the automobile 1 from between the other vehicles. This eliminates the inconvenience of waiting until one of the other vehicles has been moved to provide sufficient space to drive away.

Having described my invention, what I claim is:

1. In combination with a vehicle, a bumper slidably mounted on the frame of the said vehicle, and means extending within the body of the said vehicle to regulate the movement of the said bumper relative to the said frame, the said means comprising reciprocating bumper supporting means, gear means for actuating the bumper supporting means, a drum secured to the gear means, a second drum rotatably mounted in the vehicle, an endless cable extending over the two drums, and a crank secured to one of the drums for rotating the latter to wind the cable in such a manner that the gear means may be actuated to reciprocate the bumper to extended or to retracted positions.

2. In combination with a vehicle, a bumper, a plurality of bumper supporting members, guide rollers mounted on the frame of the said vehicle to guide the said supporting members in a direction substantially parallel to the sides of the said frame, a shaft adjacent and substantially normal to the said members, a plurality of pinion gears pinned to the said shaft adapted to mesh with straight gears formed on the said members, a drum pinned to the said shaft, and a flexible cable mounted on the said drum and extending around a crank-operated drum mounted within the body of the said vehicle.

ELISE D. WALTER.